US012674881B2

(12) United States Patent
Kusumoto et al.

(10) Patent No.: US 12,674,881 B2
(45) Date of Patent: Jul. 7, 2026

(54) TRACKING APPARATUS

(71) Applicant: DENSO CORPORATION, Kariya-city (JP)

(72) Inventors: Tetsuya Kusumoto, Nisshin-city (JP); Shingo Shimizu, Nisshin-city (JP); Takashi Ogawa, Kariya-city (JP); Masaki Yoneda, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 253 days.

(21) Appl. No.: 18/505,976

(22) Filed: Nov. 9, 2023

(65) Prior Publication Data

US 2024/0069187 A1  Feb. 29, 2024

Related U.S. Application Data

(63) Continuation of application No. PCT/JP2022/018928, filed on Apr. 26, 2022.

(30) Foreign Application Priority Data

May 12, 2021   (JP) ................................. 2021-081239

(51) Int. Cl.
*G01S 13/66* (2006.01)
(52) U.S. Cl.
CPC .................................... *G01S 13/66* (2013.01)
(58) Field of Classification Search
None
See application file for complete search history.

(56) References Cited

U.S. PATENT DOCUMENTS 6,226,409 B1 * 5/2001 Cham ..................... G06F 18/21
                                                    382/228
6,314,204 B1 * 11/2001 Cham ................. G06F 18/2321
                                                    382/181

(Continued)

FOREIGN PATENT DOCUMENTS

CN         106556818 A      4/2017

OTHER PUBLICATIONS

Xia, Yuxuan et al., Extended Target Poisson Multi-Bernoulli Filter, 2018, 15 pgs., https://arxiv.org/abs/1801.01353v2.
U.S. Appl. No. 18/463,156 and its entire file history.

*Primary Examiner* — Bernarr E Gregory
(74) *Attorney, Agent, or Firm* — Precision Patents, P.C.

(57) ABSTRACT

An observation allocating section exclusively allocates an observation point to each existing tracker in accordance with a distance between observation information acquired by an information acquiring section and observation information indicated by a predictive distribution. A hypothesis generating section generates a hypothesis likelihood and a hypothesis distribution, for each target tracker and for each hypothesis belonging to a hypothesis group including a first hypothesis and a second hypothesis. The first hypothesis is a hypothesis that the observation point is a result of observation of a subject target. The second hypothesis is a hypothesis that the observation point is not a result of observation of the subject target. The hypothesis likelihood is the likelihood of the hypothesis. The hypothesis distribution is the state distribution updated on the assumption that the hypothesis is correct.

8 Claims, 17 Drawing Sheets

1

(56)            References Cited

U.S. PATENT DOCUMENTS

| 6,353,679 | B1 * | 3/2002 | Cham | ................. | G06F 18/2321 |
| | | | | | 382/181 |
| 8,154,600 | B2 * | 4/2012 | Yu | ...................... | G06F 18/2321 |
| | | | | | 348/169 |
| 11,175,142 | B2 * | 11/2021 | Bageshwar | ........... | G01S 13/726 |
| 2013/0006577 | A1 * | 1/2013 | Mathews | ............. | G01S 13/726 |
| | | | | | 702/150 |
| 2016/0033276 | A1 * | 2/2016 | Bageshwar | ........... | G01S 13/867 |
| | | | | | 702/150 |
| 2016/0033281 | A1 * | 2/2016 | Bageshwar | ........... | G01S 13/867 |
| | | | | | 702/153 |
| 2016/0033282 | A1 * | 2/2016 | Bageshwar | ........... | G01S 13/867 |
| | | | | | 702/150 |
| 2016/0033633 | A1 * | 2/2016 | Bageshwar | ........... | G01S 13/867 |
| | | | | | 342/29 |
| 2019/0035088 | A1 | 1/2019 | LeGrand | | |

* cited by examiner

Figure 2:
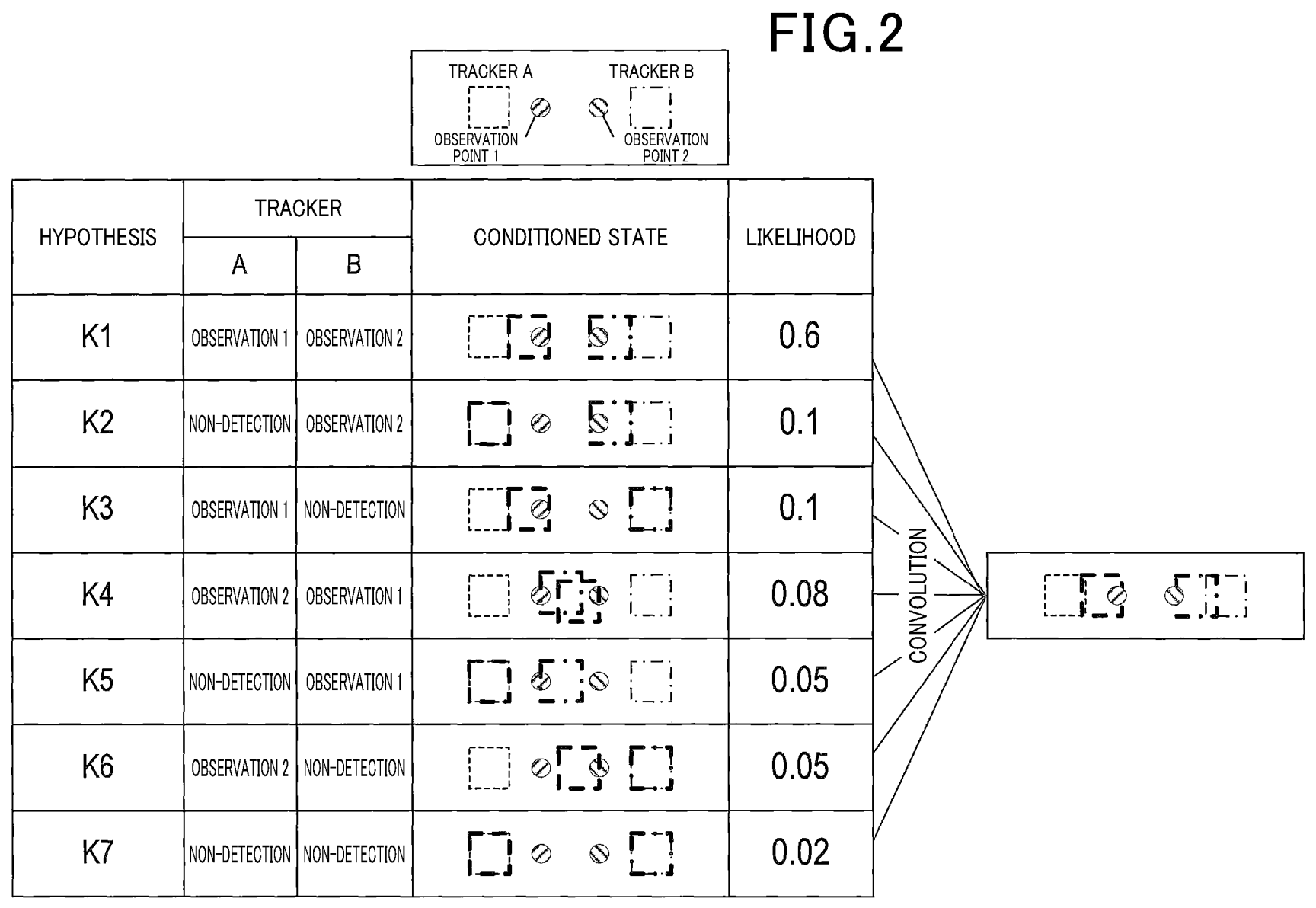

| HYPOTHESIS | TRACKER | | CONDITIONED STATE | LIKELIHOOD |
| | A | B | | |
|---|---|---|---|---|
| K1 | OBSERVATION 1 | OBSERVATION 2 | | 0.6 |
| K2 | NON-DETECTION | OBSERVATION 2 | | 0.1 |
| K3 | OBSERVATION 1 | NON-DETECTION | | 0.1 |
| K4 | OBSERVATION 2 | OBSERVATION 1 | | 0.08 |
| K5 | NON-DETECTION | OBSERVATION 1 | | 0.05 |
| K6 | OBSERVATION 2 | NON-DETECTION | | 0.05 |
| K7 | NON-DETECTION | NON-DETECTION | | 0.02 |

CONVOLUTION

FIG.3

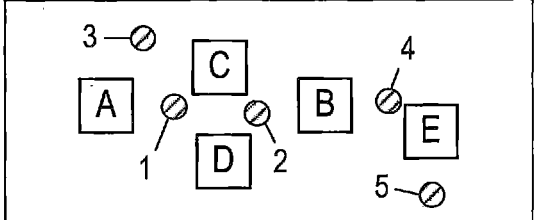

| HYPOTHESIS | TRACKER | | | | | LIKELIHOOD |
| --- | --- | --- | --- | --- | --- | --- |
| | A | B | C | D | E | |
| K1 | OBSERVATION 1 | OBSERVATION 2 | OBSERVATION 3 | OBSERVATION 4 | OBSERVATION 5 | 0.4 |
| K2 | NON-DETECTION | OBSERVATION 2 | OBSERVATION 3 | OBSERVATION 4 | OBSERVATION 5 | 0.1 |
| K3 | OBSERVATION 1 | OBSERVATION 3 | OBSERVATION 2 | OBSERVATION 4 | OBSERVATION 5 | 0.1 |
| K4 | OBSERVATION 1 | OBSERVATION 2 | OBSERVATION 4 | OBSERVATION 3 | OBSERVATION 5 | 0.08 |
| K5 | OBSERVATION 1 | NON-DETECTION | OBSERVATION 2 | OBSERVATION 4 | OBSERVATION 5 | 0.05 |
| K6 | OBSERVATION 1 | OBSERVATION 2 | OBSERVATION 3 | OBSERVATION 5 | OBSERVATION 4 | 0.05 |
| K7 | OBSERVATION 3 | OBSERVATION 2 | OBSERVATION 2 | OBSERVATION 1 | OBSERVATION 5 | 0.02 |
| . . . | . . . | . . . | . . . | . . . | . . . | . . . |
| K1545 | | | | | | |

| HYPOTHESIS | TRACKER | | CONDITIONED STATE | LIKELIHOOD |
| --- | --- | --- | --- | --- |
| | A | B | | |
| K1 | OBSERVATION 1 | OBSERVATION 2 | | 0.6 |
| K2 | NON-DETECTION | OBSERVATION 2 | | 0.1 |
| K3 | OBSERVATION 1 | NON-DETECTION | | 0.1 |
| K4 | OBSERVATION 2 | OBSERVATION 1 | | $\fallingdotseq 0$ |
| K5 | NON-DETECTION | OBSERVATION 1 | | $\fallingdotseq 0$ |
| K6 | OBSERVATION 2 | NON-DETECTION | | $\fallingdotseq 0$ |
| K7 | NON-DETECTION | NON-DETECTION | | 0.02 |

FIG.12

| | |
|---|---|
| GOAL OF IMPROVED S/N | 2.08 TIMES |
| THRESHOLD LEVEL OF SIGNAL INTENSITY | $2.40\,\sigma\,(\fallingdotseq 5\,\sigma\,/2.08)$ |
| APPLIED VIEWING ANGLE | H: 19.4°, V: 1.3° |
| ANGULAR RESOLUTION | H: 0.1°, V: 0.1° |
| NUMBER OF LIGHT RAYS | H: 194, V: 13 |
| A/D SAMPLING INTERVALS | 1.9m |
| NUMBER OF SAMPLES PER LIGHT RAY IN [0 m TO 250 m] SECTION | 132 SAMPLES |
| MAXIMUM NUMBER OF SAMPLES WITHIN APPLICATION RANGE | 37,364 SAMPLES $\fallingdotseq 194 \times 13 \times 132 \times (131.7 - 103.2) \div 250$ |
| ASSUMED NOISE AMOUNT | 306 SAMPLES |

| HYPOTHESIS | C | CONDITIONED STATE | LIKELIHOOD |
|:---:|:---:|:---:|:---:|
| K1 | OBSERVATION 3 | OMIT | 0.3 |
| K2 | OBSERVATION 4 | OMIT | 0.4 |
| K3 | OBSERVATION 5 | OMIT | 0.1 |
| K4 | OBSERVATION 6 | OMIT | 0.1 |
| K5 | NON-DETECTION | OMIT | 0.1 |

FIG.16

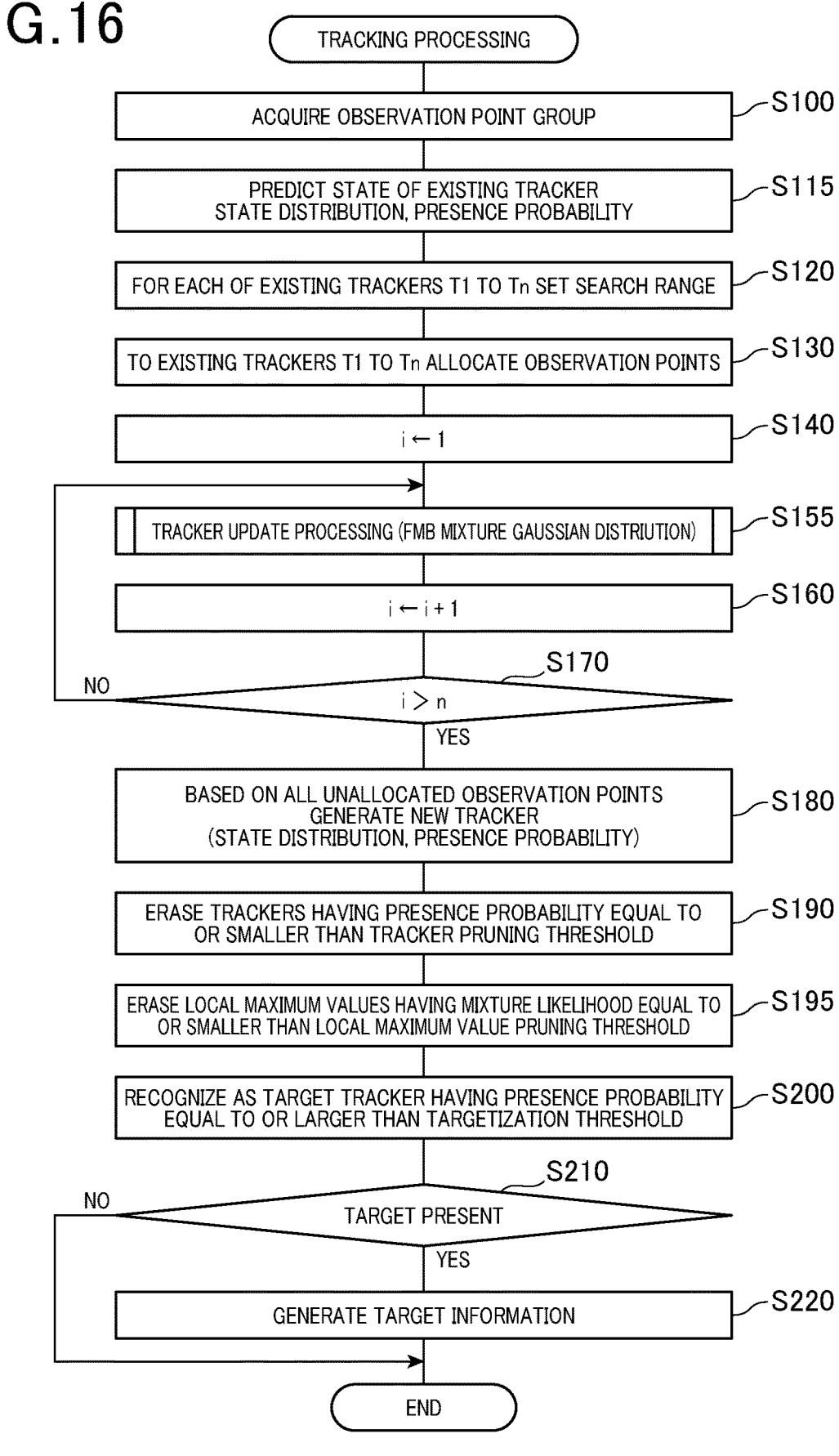

TRACKING PROCESSING

ACQUIRE OBSERVATION POINT GROUP — S100

PREDICT STATE OF EXISTING TRACKER
STATE DISTRIBUTION, PRESENCE PROBABILITY — S115

FOR EACH OF EXISTING TRACKERS T1 TO Tn SET SEARCH RANGE — S120

TO EXISTING TRACKERS T1 TO Tn ALLOCATE OBSERVATION POINTS — S130

$i \leftarrow 1$ — S140

TRACKER UPDATE PROCESSING (FMB MIXTURE GAUSSIAN DISTRIUTION) — S155

$i \leftarrow i + 1$ — S160

S170
NO
$i > n$
YES

BASED ON ALL UNALLOCATED OBSERVATION POINTS
GENERATE NEW TRACKER
(STATE DISTRIBUTION, PRESENCE PROBABILITY) — S180

ERASE TRACKERS HAVING PRESENCE PROBABILITY EQUAL TO
OR SMALLER THAN TRACKER PRUNING THRESHOLD — S190

ERASE LOCAL MAXIMUM VALUES HAVING MIXTURE LIKELIHOOD EQUAL TO
OR SMALLER THAN LOCAL MAXIMUM VALUE PRUNING THRESHOLD — S195

RECOGNIZE AS TARGET TRACKER HAVING PRESENCE PROBABILITY
EQUAL TO OR LARGER THAN TARGETIZATION THRESHOLD — S200

S210
NO
TARGET PRESENT
YES

GENERATE TARGET INFORMATION — S220

END

TRACKING APPARATUS

CROSS-REFERENCE TO RELATED APPLICATION

This application is the U.S. bypass application of International Application No. PCT/JP2022/018928 filed on Apr. 26, 2022, which designated the U.S. and claims priority to Japanese Patent Application No. 2021-081239 filed on May 12, 2021, the contents of both of which are incorporated herein by reference.

TECHNICAL FIELD

The present disclosure relates to a tracking apparatus that tracks a target.

BACKGROUND

NN tracking and RFS tracking are known as tracking operations using information from observation points to sequentially update the state of a tracker representing a target candidate being tracked. NN stands for Nearest Neighbor, and RFS stands for Random Finite Set.

N tracking includes updating the state of a tracker using information from one observation point closest to the tracker. RFS tracking uses information from all the observation points within a certain range from an RFS tracker. RFS tracking is disclosed in, for example, U.S. Patent Application No. 2019/0035088.

SUMMARY

An aspect of the present disclosure is a tracking apparatus including an information acquiring section, a tracker generating section, a state predicting section, and a state updating section.

The information acquiring section is configured to acquire, for each processing cycle, observation information from a sensor observing a state of a target present around a vehicle. The tracker generating section is configured to generate a tracker having a state distribution probabilistically indicating a state of the observation information for each of observation points satisfying a preset generation condition and included in an observation point group including one or more observation points for which the observation information is acquired by the information acquiring section. The state predicting section is configured to generate a predictive distribution for each of existing trackers that are trackers generated up to a last processing cycle, the predictive distribution being a state distribution in which the state of the observation information of the existing tracker in a current processing cycle is predicted from the state distribution of the existing tracker. The state updating section is configured to update, for each of the existing trackers, the state distribution of the existing tracker using the predictive distribution generated by the state predicting section and the observation information obtained from the observation point group in the current processing cycle.

The state updating section includes an observation allocating section and a hypothesis generating section.

The observation allocating section is configured to exclusively allocate the observation point to each of the existing trackers in accordance with a distance between the observation information acquired by the information acquiring section and the observation information indicated by the predictive distribution. The hypothesis generating section is configured to generate, for each target tracker and for each hypothesis belonging to a hypothesis group including a first hypothesis and a second hypothesis, a hypothesis likelihood that is a likelihood of the hypothesis and a hypothesis distribution that is a state distribution updated on an assumption that the hypothesis is correct. The first hypothesis is a hypothesis that the observation point is a result of observation of a subject target. The second hypothesis is a hypothesis that the observation point is not a result of observation of the subject target. The subject tracker is an existing tracker to which an observation point is allocated by the observation allocating section. The subject observation point is an observation point allocated to the subject tracker. The subject target is a target associated with the subject tracker.

BRIEF DESCRIPTION OF THE DRAWINGS

The above features of the present disclosure will be made clearer by the following detailed description, given referring to the appended drawings. In the accompanying drawings:

FIG. 2 is an explanatory diagram providing an outline of processing executed by a PMB filter;

FIG. 3 is an explanatory diagram indicating that presence of a large number of trackers and observation points leads to a rapid increase in the number of hypotheses to be processed;

FIG. 12 is a graph illustrating conditions for simulation;

FIG. 16 is a flowchart illustrating tracking processing in a third embodiment;

DETAILED DESCRIPTION OF THE PREFERRED EMBODIMENTS

Figure 1:
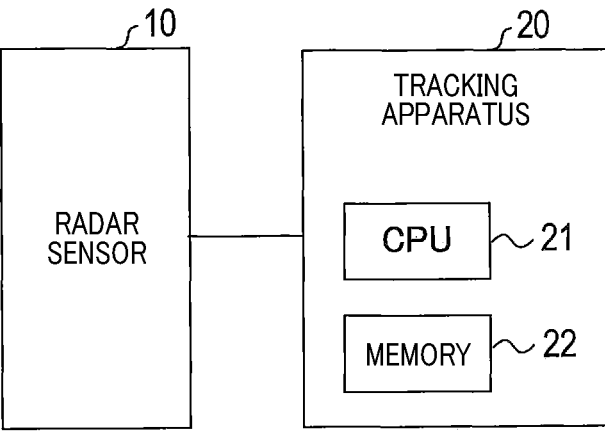
FIG. 1 is a block diagram illustrating a configuration of a radar system.

The RFS tracking disclosed in, for example, U.S. Patent Application No. 2019/0035088 includes using a detection probability from each of the plurality of observation points and an presence probability for each of the plurality of trackers to generate a plurality of hypotheses representing a correspondence relationship between the plurality of trackers and the plurality of observation points, calculating a likelihood for each of the hypotheses, and performing tracking with all the hypotheses taken into account. An approach is also known that includes using the likelihood of each hypothesis to obtain a convolution of the state of the tracker updated in accordance with the hypothesis, reducing the number of hypotheses propagated during the next processing cycle.

However, detailed studies by the inventor have resulted in finding of the following problems. In RFS tracking, an increased number of observation points or trackers exponentially increases the number of hypotheses or the amount of operation required for the tracking, particularly the amount of operation required to calculate the likelihood of the hypothesis. Consequently, RFS tracking is difficult to apply to an in-vehicle tracking apparatus and the like, for which real-time processing is required.

An aspect of the present disclosure provides a technology for suppressing the amount of operation while maintaining the accuracy of tracking.

An aspect of the present disclosure is a tracking apparatus including an information acquiring section, a tracker generating section, a state predicting section, and a state updating section.

The information acquiring section is configured to acquire, for each processing cycle, observation information from a sensor observing a state of a target present around a vehicle. The tracker generating section is configured to generate a tracker having a state distribution probabilistically indicating a state of the observation information for each of observation points satisfying a preset generation condition and included in an observation point group including one or more observation points for which the observation information is acquired by the information acquiring section. The state predicting section is configured to generate a predictive distribution for each of existing trackers that are trackers generated up to a last processing cycle, the predictive distribution being a state distribution in which the state of the observation information of the existing tracker in a current processing cycle is predicted from the state distribution of the existing tracker. The state updating section is configured to update, for each of the existing trackers, the state distribution of the existing tracker using the predictive distribution generated by the state predicting section and the observation information obtained from the observation point group in the current processing cycle.

The state updating section includes an observation allocating section and a hypothesis generating section.

The observation allocating section is configured to exclusively allocate the observation point to each of the existing trackers in accordance with a distance between the observation information acquired by the information acquiring section and the observation information indicated by the predictive distribution. The hypothesis generating section is configured to generate, for each target tracker and for each hypothesis belonging to a hypothesis group including a first hypothesis and a second hypothesis, a hypothesis likelihood that is a likelihood of the hypothesis and a hypothesis distribution that is a state distribution updated on an assumption that the hypothesis is correct. The first hypothesis is a hypothesis that the observation point is a result of observation of a subject target. The second hypothesis is a hypothesis that the observation point is not a result of observation of the subject target. The subject tracker is an existing tracker to which an observation point is allocated by the observation allocating section. The subject observation point is an observation point allocated to the subject tracker. The subject target is a target associated with the subject tracker.

Such a configuration prevents one observation point from being allocated to a plurality of trackers, reducing the number of combinations of a tracker and an observation point, that is, the number of hypotheses. This enables a reduction in computational load in tracking processing.

Embodiments of the present disclosure will be described below with reference to the drawings.

1. First Embodiment

1-1. Configuration

A radar system 1 according to the present embodiment is mounted in a vehicle and used to detect various targets present around the vehicle in which the radar system 1 is mounted.

As illustrated in FIG. 1, the radar system 1 includes a radar sensor 10 and a tracking apparatus 20.

As the radar sensor 10, a LiDAR is used that irradiates a detection area with laser light and receives reflected light to generate position information regarding an observation point representing a point having reflected the laser light. LiDAR stands for Light Detection and Ranging. However, the radar sensor 10 is not limited to the LiDAR, but only needs to be able to obtain position information regarding the observation point, and may be a millimeter wave radar, an ultrasonic radar, or the like.

The detection area is set, for example, in front of the vehicle. However, the detection area is not limited to the front of the vehicle, and one or more detection areas may be set in such a manner that the detection area corresponds to an area behind, to the right of, to the left of, forward right of, backward right of, forward left of, or backward left of the vehicle. With a plurality of detection areas, each of the detection areas may be provided with the radar sensor 10. The detection areas may be set in such a manner as to avoid overlapping one another or to partly overlap one another. The range of the detection area is defined by a horizontal angle range $\theta h$ and a vertical angle range $\theta v$.

The radar sensor 10 scans through the detection area with an angle resolution $\Delta\theta h$ in the horizontal direction and with an angle resolution $\Delta\theta h$ in the vertical direction. In other words, the radar sensor 10 irradiates the detection area with $(\theta h/\Delta\theta h)\times(\theta v/\Delta\theta v)$ light rays and performs a predetermined number of sampling operations on each light ray. The sampling interval is set in such a manner as to satisfy a specified distance resolution $\Delta R$. In other words, the radar sensor 10 executes sampling operations during one second, the number of which is obtained by dividing the time required for light to make a round trip of a maximum detection distance Rmax by the sampling interval (that is, $2\times Rmax/c/\Delta R$ sampling operations).

Then, a peak having a signal strength equal to or larger than a peak threshold is extracted from a waveform indicated by a value sampled for each of the light rays, and position information regarding the observation point is generated using a sampling timing (or distance) for the peak, and the horizontal angle and vertical angle of the light ray radiated. The peak threshold is set to allow a desired S/N to be obtained. The position information need not necessarily be represented by a three-dimensional polar coordinate system using distance, horizontal angle, and vertical angle, and may be represented by a three-dimensional orthogonal coordinate system.

The tracking apparatus 20 includes a microcomputer including a CPU 21, and a semiconductor memory such as a RAM, a ROM, or a flash memory (hereinafter referred to as the memory 22). The tracking apparatus 20 may include a coprocessor.

The tracking apparatus 20 executes at least tracking processing when the CPU 21 runs a program stored in the memory 22.

Based on the position information regarding the observation point, obtained from the radar sensor 10, the tracking processing generates target information that is information related to a target present within the detection area.

The target information generated by the tracking processing is used for various processing operations performed to assist driving, processing for estimating axis misalignment of the radar sensor 10. The driving assistance includes, for example, Adaptive Cruise Control (hereinafter referred to as ACC), Lane Keeping Assist (hereinafter referred to as LKA), Lane Change Assist (hereinafter referred to as LCA), lane departure warning, overtake assist, intervention control, automatic control, self-driving, and the like.

1-2. Outline of Tracking

Processing using an FMB filter (hereinafter referred to as FMB) will be described in brief, the processing being a type of RFS tracking employed for the tracking processing. The FMB is obtained by improving existing processing using a PMB filter (hereinafter referred to as PNB), and executes faster processing than the PMB. FMB stands for Fast Multi-Bernoulli, and PMB stands for Poisson Multi-Bernoulli.

Here, as the estimated state of a target, the position of the target is used. However, the estimated state of the target is not limited to the position. Here, for easy understanding, an example will be described in which while two targets are being tracked using trackers A and B, two observation points are obtained.

In RFS tracking, seven hypotheses representing combinations of two trackers A and B and two observation points are considered, as illustrated in FIG. 2. Specifically, a hypothesis i is represented as Ki (an observation point where the tracker A has been observed and an observation point where the tracker B has been observed), and two observation points are represented as "observation 1" and "observation 2". A case corresponding to neither observation points is represented as "not observed yet". Seven hypotheses include K1 (observation 1, observation 2), K2 (not observed yet, observation 2), K3 (observation 1, not observed yet), K4 (observation 2, observation 1), K5 (not observed yet, observation 1), K6 (observation 2, not observed yet), and K7 (not observed yet, not observed yet).

Then, for each of the hypotheses K1 to K7, a state distribution and a hypothesis likelihood are calculated, and the calculated hypothesis likelihoods are used to convolute the state distributions of all the hypotheses K1 to K7 to integrate the hypotheses K1 to K7 into one hypothesis. Note that the state distribution is a distribution probabilistically representing the state of a tracker (position). As the state distribution, for example, a Gaussian distribution is used.

The state distribution is calculated by updating a state distribution obtained in the last processing cycle using an extended Kalman filter (hereinafter referred as EKF) based on observation information obtained by observation. However, for each hypothesis, on the assumption that each hypothesis is correct, a state distribution is generated by updating the state distribution obtained in the last processing cycle. The hypothesis likelihood is ε value representing the plausibility of a hypothesis of interest. The hypothesis likelihood is calculated from the closeness from the tracker to the observation point, an error in the sensor used for observation, detection probability, misdetection probability, the probability of presence of a tracker in the last processing cycle, and the like.

Now, the above-described processing is generalized into a case where while a target is being tracked using n trackers, n observations are obtained. Then, the number of hypotheses Knum to be considered for the PMB is represented by Equation (1).

[Math. 1]

$$K_{num} = \sum_{k=1}^{n} (_n P_k \cdot _n C_{n-k}) \tag{1}$$

For example, for n=5, the number of hypotheses is 1545, as indicated in FIG. 3. In the observation by the LiDAR, n is approximately 300, and combinatorial explosion causes the number of hypotheses to exceed the amount of operation that can be processed in real time.

Thus, the FMB assumes that an on-road obstacle corresponding to a target to be tracked is "stationary" and does not make an unpredictable motion and that the LiDAR has very high ranging accuracy but non-detection and misdetection occur to a non-negligible degree.

Figure 4:
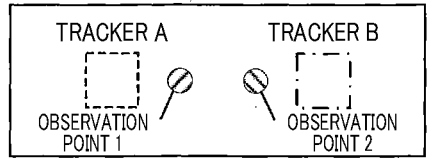
FIG. 4 is an explanatory diagram illustrating a hypothesis to be processed in an FMB filter.
Figure 5:
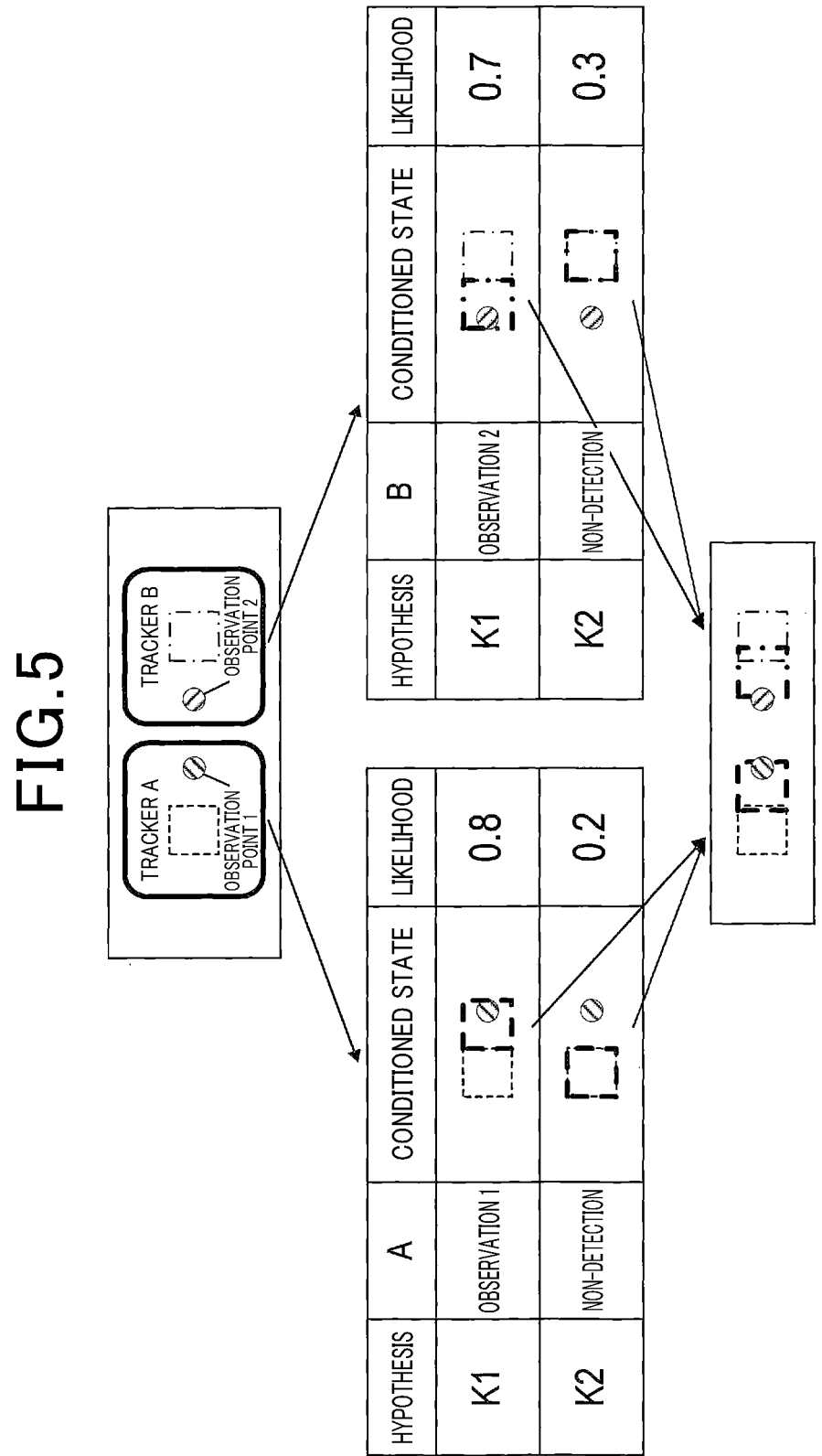
FIG. 5 is an explanatory diagram providing an outline of processing executed by the FMB filter.

Under the above-described assumption, as illustrated in FIG. 4, the hypotheses 4 to 6 necessarily have a likelihood of a value close to 0; in the hypothesis 4 to 6, the tracker of interest is necessarily allocated the nearest observation point and the trackers are allocated the observation points other than the nearest observation point Then, as illustrated in FIG. 5, the hypotheses to be considered for each tracker are classified into only two patterns: the pattern in which the tracker is observed at the nearest observation point and the pattern in which the tracker is not observed at the nearest observation point. In other words, the number Knum of hypotheses to be considered decreases from a number calculated by Equation (1) to 2n.

1-3. Processing

Now, the tracking processing executed by the tracking apparatus 20 will be described with reference to a flowchart in FIG. 6.

The tracking processing is executed by the radar sensor 10 at time intervals each required to scan the entire detection area (hereinafter referred to as the processing cycle). When the tracking processing is started, in S100, the tracking apparatus 20 acquires, from the radar sensor 10, observation information representing observation results. The observation information includes all the observation points having a signal intensity exceeding a threshold (hereinafter referred to as the observation point group).

In the subsequent S110, n denotes the number of trackers generated up to the last processing cycle (hereinafter referred to as existing trackers), and the tracking apparatus 20 predicts, for each of the existing trackers T1 to Tn, the state distribution of the existing tracker in the current processing cycle. Furthermore, for each of the existing trackers T1 to Tn, the tracking apparatus 20 calculates the presence probability of a target associated with an existing tracker Ti in accordance with Equation (2).

[Math. 2]

$$r_{k|k-1} = P_s \times r_{k-1|k-1} \tag{2}$$

$r_{k|k-1}$ is the presence probability of the existing tracker after prediction, $r_{k-1|k-1}$ is the presence probability of the existing tracker before prediction, and Ps is a constant representing the presence probability of the target and having a value less than 1 but close to 1.

The prediction of the state distribution uses an approach used in the EKF. Note that the state distribution is represented by a Gaussian distribution. In the EKF, the position of a peak in the state distribution of the tracker in the last processing cycle (that is, the average value of the state distribution) is moved by an amount corresponding to the duration of one cycle in accordance with speed information of the tracker. Furthermore, in the EKF, a predicted value for the state distribution (hereinafter referred to as the predictive distribution) is obtained by diffusing the extent of the state distribution (that is, the variance of the Gaussian distribution) by an amount corresponding to the duration of one cycle.

In the subsequent S120, for each of the existing trackers T1 to TN, the tracking apparatus 20 sets a search range in which a distance from a position indicated by the average value of the predictive distribution is equal to or shorter than an upper limit distance. The distance used is the Mahalanobis' distance. However, the Euclid distance or any other distance may be used.

In the subsequent S130, the tracking apparatus 20 exclusively allocates each of the existing trackers T1 to Tn with an observation point belonging to the observation point group. Specifically, the existing tracker of interest is allocated one of the observation points existing within the search range set for the existing tracker of interest, the observation point being closest to the center of the search range. This processing is also referred to as gating. As a result of gating, each existing tracker is allocated up to one observation point. Each observation point may be allocated to any one or none of the existing trackers.

Figure 7:
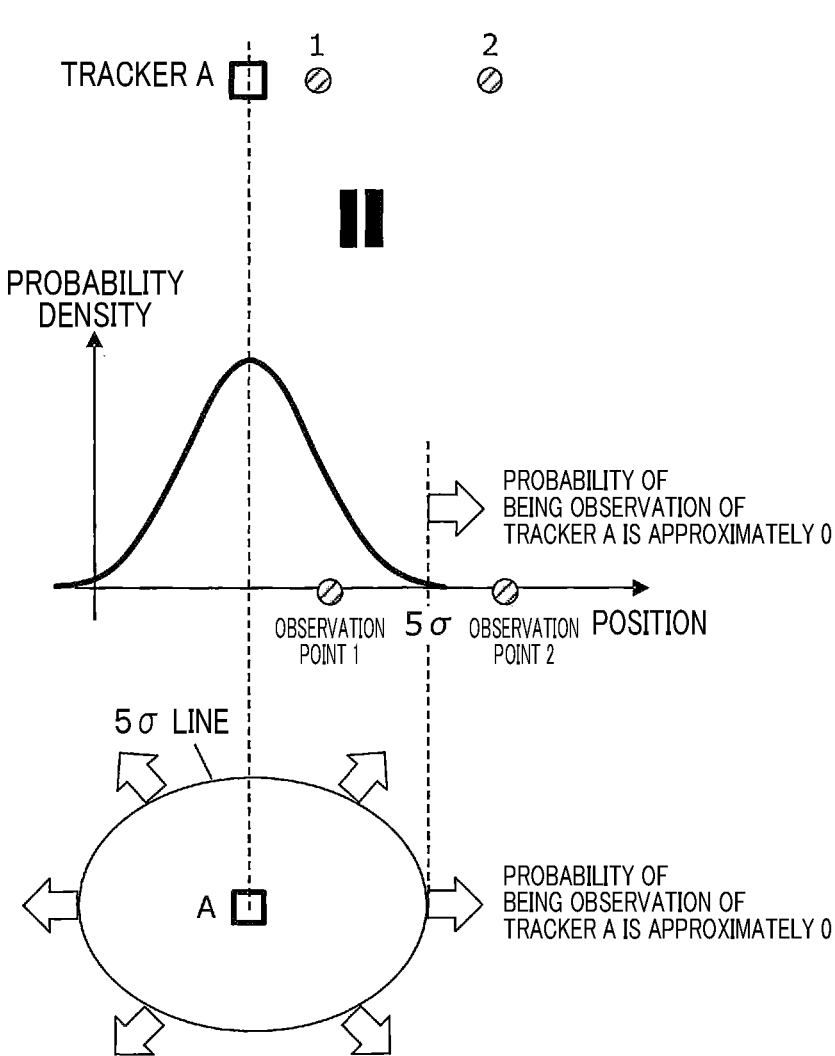
FIG. 7 is an explanatory diagram illustrating a manner of setting a search range.

For example, as illustrated in FIG. 7, the upper limit distance used to define the search range is a distance corresponding to 5σ in the Gaussian distribution. Note that in the Gaussian distribution, the presence probability is substantially 0 outside 5σ in the Gaussian distribution. However, to suppress misdetection, the upper limit distance may be set smaller than 5σ. In other words, an increased upper limit distance reduces the non-detection probability at which detection is prevented despite presence but increases the misdetection probability at which the existing tracker of interest is associated with an observation point not having observed the existing tracker. In contrast, a reduced upper limit distance increases the non-detection probability but reduces the misdetection probability.

In the subsequent S140, the tracking apparatus 20 sets, to 1, an identifier i identifying the existing trackers T1 to Tn.

In the subsequent S150, the tracking apparatus 20 executes tracker update processing for updating the state distribution of the existing tracker Ti.

Figure 8:
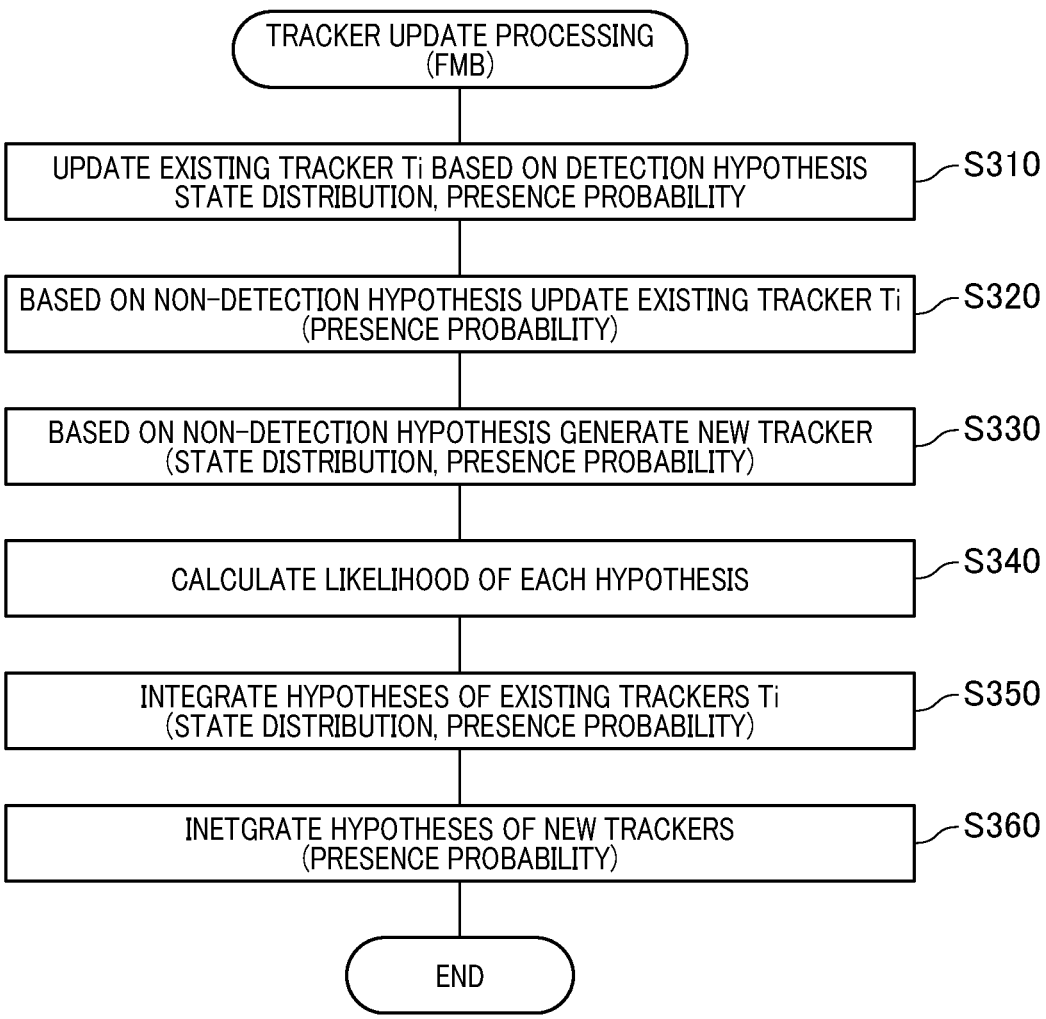
FIG. 8 is a flowchart illustrating tracker updating processing in the first embodiment.

Here, the details of the tracker update processing will be described with reference to a flowchart in FIG. 8. The FMB described above is applied to the tracker update processing.

In S310, based on the hypothesis that the observation point allocated to the existing tracker Ti has observed the existing tracker Ti (hereinafter referred to as the detection hypothesis), the tracking apparatus 20 updates the state of the existing tracker Ti. Specifically, the tracking apparatus 20 uses the EKF to update the state distribution of the existing tracker Ti and updates the presence probability $rr_{det}$ of the target associated with the existing tracker Ti in accordance with Equation (3).

[Math. 3]

$$rr_{det_{k|k}} = 1 \tag{3}$$

In the subsequent S320, based on the hypothesis that the observation point allocated to the existing tracker Ti has not observed the existing tracker Ti (hereinafter referred to as the non-detection hypothesis), the tracking apparatus 20 updates the state of the existing tracker Ti. Specifically, in S120, the tracking apparatus 20 uses the predictive distribution calculated in S210 as an estimated distribution of the existing tracker Ti, and updates the presence probability $rr_{mis}$ of the target associated with the existing tracker Ti in accordance with Equation (4).

[Math. 4]

$$rr_{mis_{k|k}} = \frac{r_{k|k-1}(1 - P_d)}{(1 - r_{k|k-1}) + r_{k|k-1}(1 - P_d)} \tag{4}$$

Pd represents the detection probability of the radar sensor 10, that is, the probability at which an actual target can be detected. The detection probability Pd is a constant determined by the performance of the radar sensor 10. Note that the non-detection includes a case where no target corresponding to the existing tracker Ti is originally non-present and a case where a target corresponding to the existing tracker Ti is present but has not been detected by the radar sensor 10, and Equation (4) indicates the latter case of probability.

In the subsequent S330, the tracking apparatus 20 generates a new tracker based on the non-detection hypothesis. Specifically, the tracking apparatus 20 generates the state distribution of a new tracker in which the position of the observation point is the average of the distribution and in which an error variance of the radar sensor 10 is the variance of the distribution. Furthermore, the tracking apparatus 20 calculates the presence probability $rr_{new}$ of the target associated with the new tracker in accordance with Equation (5).

[Math. 5]

$$rr_{new} = \frac{P_d \cdot D_{new}}{C + P_d \cdot D_{new}} \tag{5}$$

$D_{new}$ is a birth rate representing how many observation points are detected per sample of one light ray for a plurality of light rays radiated in a determined direction within the search range. C represents the misdetection probability of the radar sensor 10, that is, the probability at which a non-actual target is detected, and is also referred to as a clutter rate. The birth rate $D_{new}$ and the misdetection probability C are each an experimentally determined constant.

In the subsequent S340, the tracking apparatus 20 calculates the hypothesis likelihood $W_1$ of the detection hypothesis and the hypothesis likelihood $W_2$ of the non-detection hypothesis. Specifically, a hypothesis likelihood $WD_1$ before normalization related to the detection hypothesis is calculated by Equation (6), and a hypothesis likelihood $WD_2$ before normalization related to the non-detection hypothesis is calculated by Equation (7). Furthermore, Equations (8) and (9) are used to normalize the hypothesis likelihoods $WD_1$ and $WD_2$ to calculate the hypothesis likelihoods $W_1$ and $W_2$, which are summed to a value of 1.

[Math. 6]

$$WD_1 = r_{k|k-1} \cdot P_d \cdot qz \tag{6}$$

$$WD_2 = \{(1 - r_{k|k-1}) + r_{k|k-1}(1 - P_d)\} \cdot (C + P_d \cdot D_{new}) \tag{7}$$

$$W_1 = \frac{WD_1}{WD_1 + WD_2} \tag{8}$$

$$W_2 = \frac{WD_2}{WD_1 + WD_2} \tag{9}$$

In the subsequent S350, the tracking apparatus 20 integrates the two hypotheses generated for the existing tracker Ti to update the state distribution. Specifically, the tracking apparatus 20 generates a state distribution p(i) of the existing tracker Ti in accordance with Equation (10) and calculates the presence probability r of the target associated with the existing tracker Ti in accordance with Equation (11).

[Math. 7]

$$p(i)_{k|k} = N(i; \ W_1 \cdot \mu_1 + W_2 \cdot \mu_2, \ W_1 \cdot P_1 + W_2 \cdot P_2) \tag{10}$$

$$r_{k|k} = W_1 \cdot rr_{det_{k|k}} + W_2 \cdot rr_{mis_{k|k}} \tag{11}$$

Figure 9:
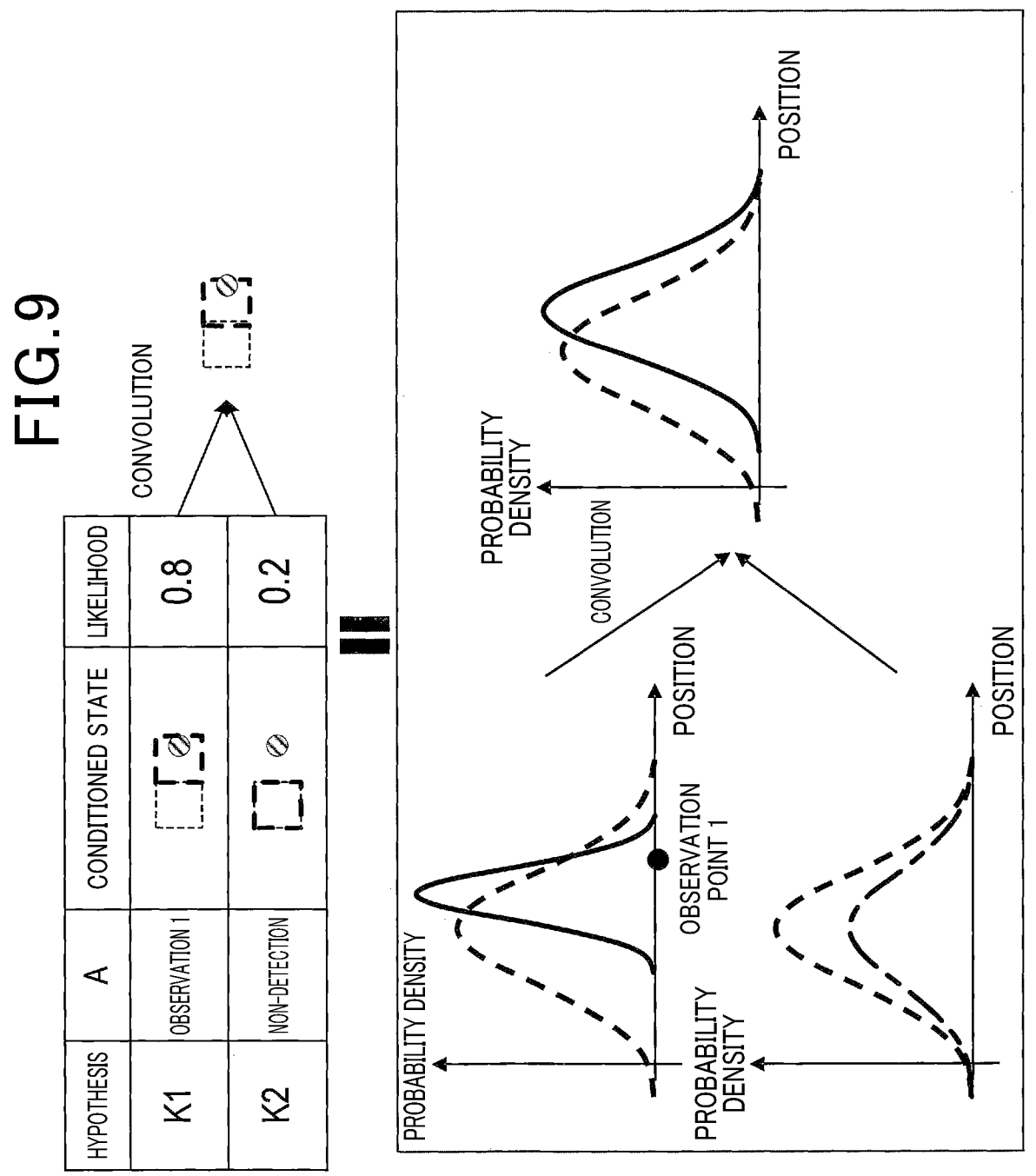
FIG. 9 is an explanatory diagram illustrating a manner in which the tracker update processing varies a state distribution in a case where the state distribution used is a Gaussian distribution.

In other words, as illustrated in FIG. 9, the average of the distribution in the updated state distribution p(i) corresponds to a value obtained by using the hypothesis likelihoods $W_1$ and $W_2$ to synthesize (that is, convolute) the averages $\mu_1$ and $\mu_2$ of two state distributions (hereinafter referred to as the hypothesis distributions) based on two hypotheses. The variance of the distribution in the updated state distribution p(i) corresponds to a value obtained by using the hypothesis likelihoods $W_1$ and $W_2$ to synthesize (that is, convolute) variances $P_1$ and $P_2$ of two hypothesis distributions.

In the subsequent S360, the tracking apparatus 20 integrates the presence probability of the new tracker generated in S330 in accordance with Equation (12), and ends the tracker update processing.

[Math. 8]

$$r_{new} = W_1 \cdot O + W_2 \cdot rr_{new} \tag{12}$$

Figure 6:
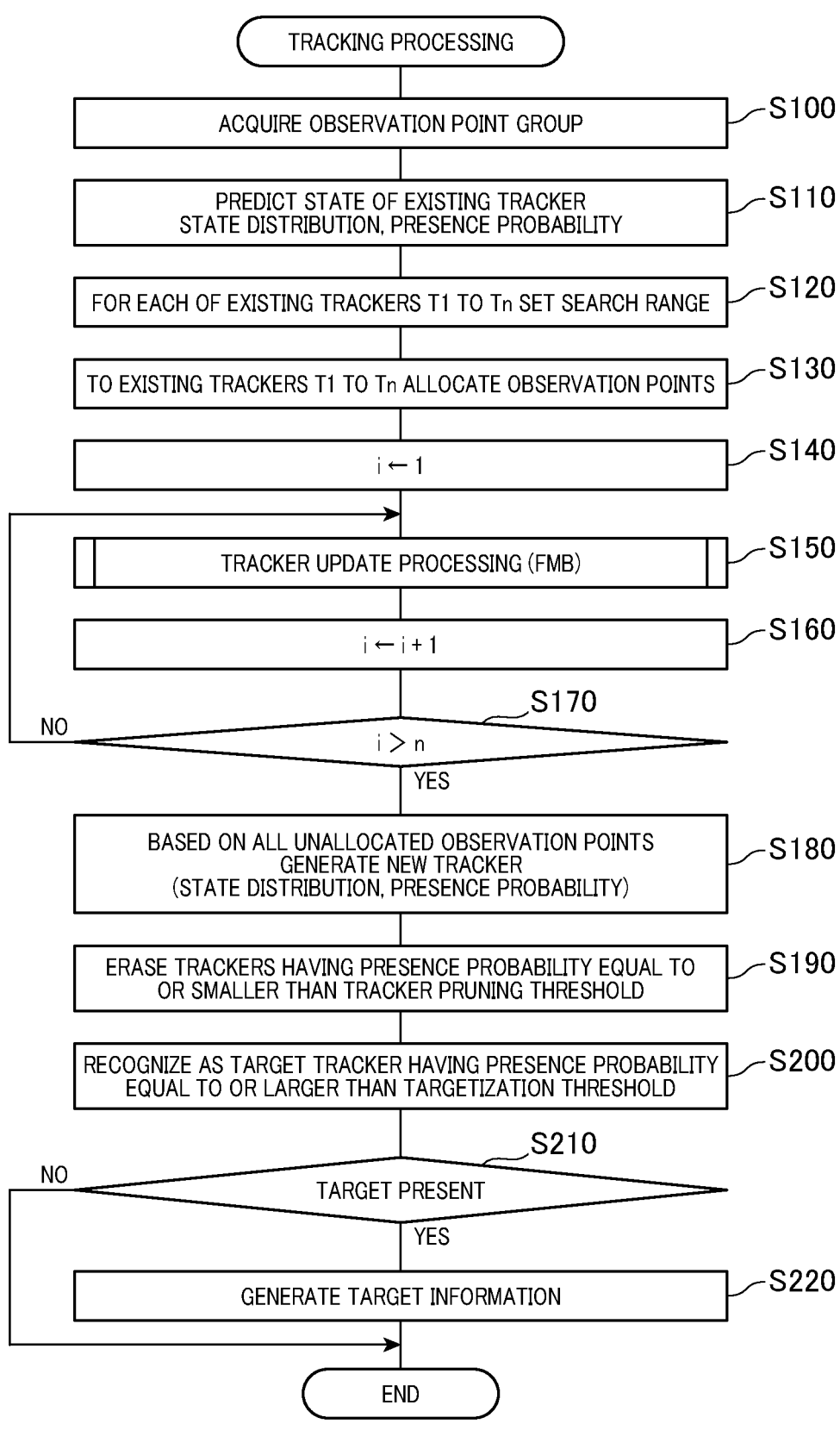
FIG. 6 is a flowchart illustrating tracking processing in a first embodiment.

Once the tracker update processing ends, referring to FIG. 6, in the subsequent S160, the tracking apparatus 20 increments the identifier i.

In the subsequent S170, the tracking apparatus 20 determines whether the identifier i is larger than the number n of existing trackers. For i>n, the tracking apparatus 20 determines that the tracker update processing has been executed on all the existing trackers, and shifts the processing to S180. For i≤n, an existing tracker is present on which the tracker update processing has not been executed, the processing is returned to S150.

In S180, under the generation condition that the observation point has been allocated to none of the existing trackers T1 to TN in S130 described above, the tracking apparatus 20 generates a new tracker based on each of the observation points satisfying the generation condition. Specifically, the tracking apparatus 20 generates a state distribution of a new tracker indicated by the Gaussian distribution in which the position of the observation point is the average of the distribution and in which the error variance of the radar sensor 10 is the variance of the distribution. Furthermore, the tracking apparatus 20 calculates the presence probability of the target associated with the new tracker in accordance with Equation (5).

In the subsequent S190, the tracking apparatus 20 erases the trackers for which the target associated with the tracker has an presence probability r equal to or lower than a tracker pruning threshold, from among the existing trackers T1 to Tn inherited from the last processing cycle and the new tracker generated in the current processing cycle. The tracker pruning threshold is set according to the processing capability of the tracking apparatus 20 in such a manner that the number of trackers propagated in the next processing cycle is equal to or smaller than the number of trackers that can be processed by the tracking apparatus 20.

In the subsequent S200, the tracking apparatus 20 extracts the trackers for which the target associated with the tracker has an presence probability r equal to or higher than a targetization threshold, from among the trackers left unerased in S190, and recognizes, as an actual target, the target associated with each of the extracted trackers.

In the subsequent S210, the tracking apparatus 20 determines whether any target was recognized to be actual (hereinafter referred to as the recognized target) in S200. The tracking apparatus 20 proceeds to S220 when there is a recognized target, and ends the processing when there is no recognized target.

In S220, the tracking apparatus 20 uses information regarding the tracker associated with the recognized target to generate target information that is information related to the recognized target, and ends the processing. The target information includes at least position information.

1-4. Correspondence Between Terms

In the present embodiment, S100 corresponds to an information acquiring section in the present disclosure, S110 corresponds to a state predicting section in the present disclosure, S120 corresponds to a range setting section in the present disclosure, and S130 to S170 correspond to a state updating section in the present disclosure. S180 corresponds to a tracker generating section in the present disclosure, S190 corresponds to a tracker pruning section in the present disclosure, and S130 corresponds to an observation allocating section in the present disclosure. Furthermore, S310 and S320 correspond to a hypothesis generating section in the present disclosure, S340 and S350 correspond to a hypothesis integrating section in the present disclosure, and S110, S150, and S180 correspond to a determination value generating section in the present disclosure. Note that in S130, the existing tracker to which an observation point is allocated corresponds to a subject tracker in the present disclosure, the observation point allocated to the subject tracker corresponds to a subject observation point in the present disclosure, and the target associated with the subject tracker corresponds to the subject target in the present disclosure. The detection hypothesis corresponds to a first hypothesis in the present disclosure, and the non-detection hypothesis corresponds to a second hypothesis in the present disclosure. The two hypotheses generated for the existing tracker Ti correspond to a hypothesis group in the present disclosure.

1-5. Effects

The first embodiment described above in detail produces the following effects.

(1a) When allocating observation points to the existing trackers T1 to Tn, the tracking apparatus 20 allocates each of the existing trackers with one of the observation points present within the search range set for the existing tracker Ti of interest, the observation point being closest to the existing tracker. In other words, no hypothesis is generated that is related to an observation point having a hypothesis likelihood of approximately 0 due to closeness to the existing tracker Ti, and such a hypothesis is removed before calculation is executed. This reduces the computational load in the tracking processing.

(1b) The tracking apparatus 20 generates, for each existing tracker Ti, two hypotheses, a detection hypothesis, and a non-detection hypothesis, for one observation point allocated to the existing tracker Ti. In other words, the number of hypotheses for the allocation of observation points is 2n. Thus, compared to the PMB, which exponentially increases the number of hypotheses with respect to the number n of existing trackers, the first embodiment can substantially reduce the number of hypotheses treated in the tracking processing. Note that in the tracking processing, the calculation of the hypothesis likelihood required to be calculated for each hypothesis imposes the heaviest load and thus that a reduced number of hypotheses enables a substantial reduction in computational load. As a result, the first embodiment allows tracking processing to be achieved with load reduced compared to the PMB and with performance improved compared to NN, which does not take the non-detection hypothesis into account.

(1c) The tracking apparatus 20 uses convolution to integrate the two hypotheses generated for each existing tracker Ti to reduce the number of hypotheses or the number of trackers by half, and further delete trackers with an presence probability equal to or lower than the tracker pruning threshold, from among the existing trackers and the new trackers. This reduces the number of trackers propagated to the next processing cycle, enabling a further reduction in computational load required for the tracking processing.

(1d) The tracking apparatus 20 uses the hypothesis likelihood to update, for each processing cycle, the presence probability of the target associated with the existing tracker Ti. This allows improvement of the capability of separating the targets associated with the existing tracker Ti into actual targets and non-actual target.

1-6. Experiments

Figure 10:
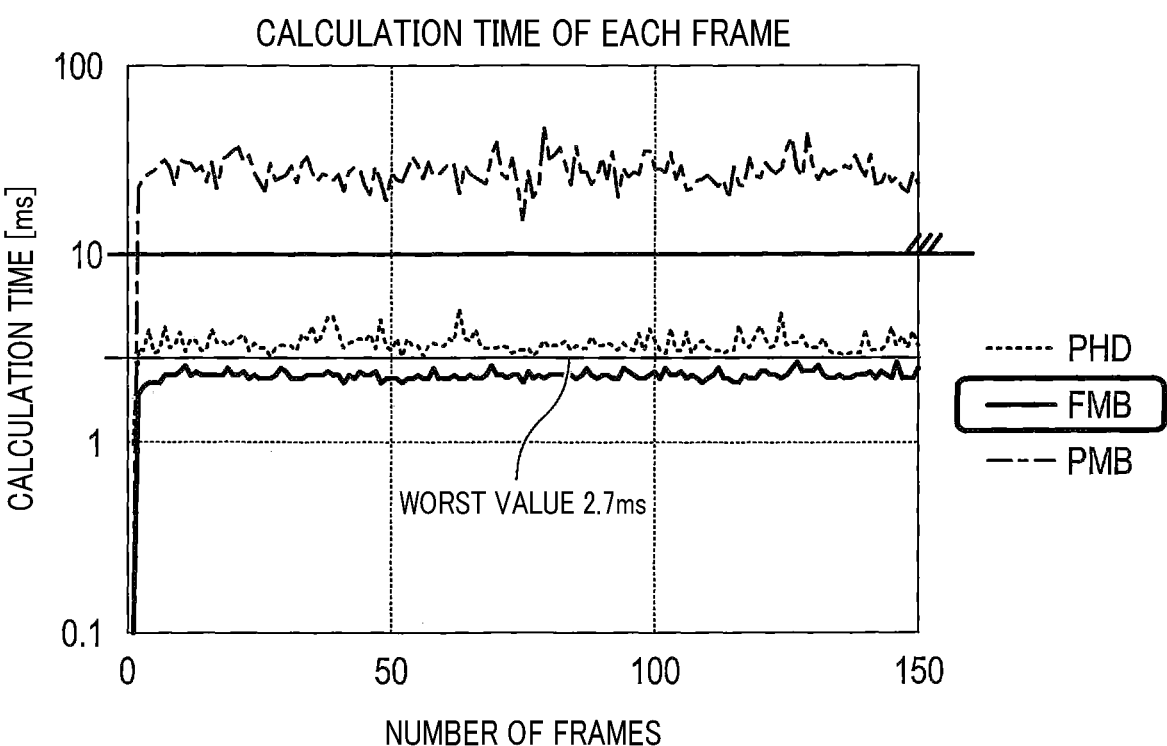
FIG. 10 is a graph illustrating a comparison between a result of simulation-based calculation of a calculation time required for tracking processing and a similar result according to a known approach.
Figure 11:
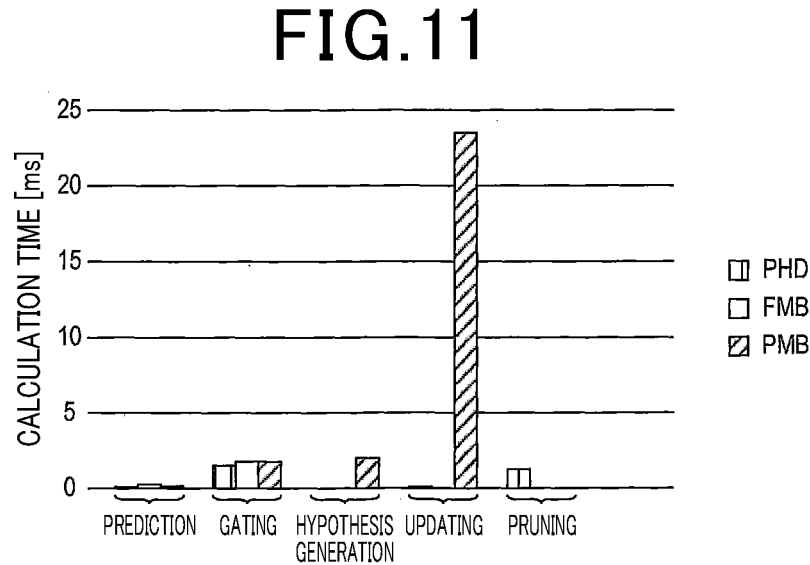
FIG. 11 is a graph illustrating a comparison between a result of calculation of a calculation time for each type of processing and a similar result according to a known approach.

FIGS. 10 and 11 illustrate results of calculation, through simulation, of the calculation time required for the tracking processing for each frame. The simulation was implemented for a case using the FMB corresponding to the present embodiment, a case using the PMB corresponding to the known art and not performing hypothesis integration, and a case using PHD corresponding to the known art and performing hypothesis integration. PHD stands for Probability Hypothesis Density.

Conditions for the simulation include a threshold level of 2.40σ, which is used to extract observation points, a horizontal viewing angle of 19.4°, a vertical viewing angle of 1.3°, a horizontal angle resolution of 0.1°, and a vertical angle resolution of 0.1° as illustrated in FIG. 12. In other words, the number of light rays used for scanning is 194 in the horizontal direction and 13 in the vertical direction. For each light ray, the sampling interval for A/D conversion corresponded to a distance resolution of 1.9 m, the maximum detection distance was 250 m, and the number of samples per light ray was 132. The application in the present processing ranged from 103.2 m to 131.7 m, the number of samples within the application range was 37364, and an assumed noise amount was 306.

As illustrated in FIG. 10, compared to the application of the PMB, the application of the FMB reduces the calculation time to approximately one-tenth. FIG. 10 also indicates that the FMB reduces the calculation time compared to the PHD.

As illustrated in FIG. 11, the results of separate measurements of the calculation time during prediction, gating, hypothesis generation, updating, and pruning indicate that compared to the PMB, the FMB significantly reduces the calculation time in hypothesis generation and in updating. Compared to the PHD, the FMB requires a general calculation time similar to that for the PHD but reduces the calculation time for pruning. Note that S110 corresponds to prediction, S120 corresponds to gating, S130 corresponds to hypothesis generation, S150 corresponds to updating, and S190 corresponds to pruning.

2. Second Embodiment

2-1. Differences from First Embodiment

A second embodiment is similar to the first embodiment in the basic configuration, and thus differences between the embodiments will be described below. Note that the same reference numerals as those in the first embodiment denote identical configurations and that for these configurations, preceding descriptions are referenced.

In the first embodiment described above, the FMB is applied to all trackers. The second embodiment differs from the first embodiment in that the PMB is applied to trackers for which combinatorial explosion is prevented.

2-2. Processing

Figure 13:
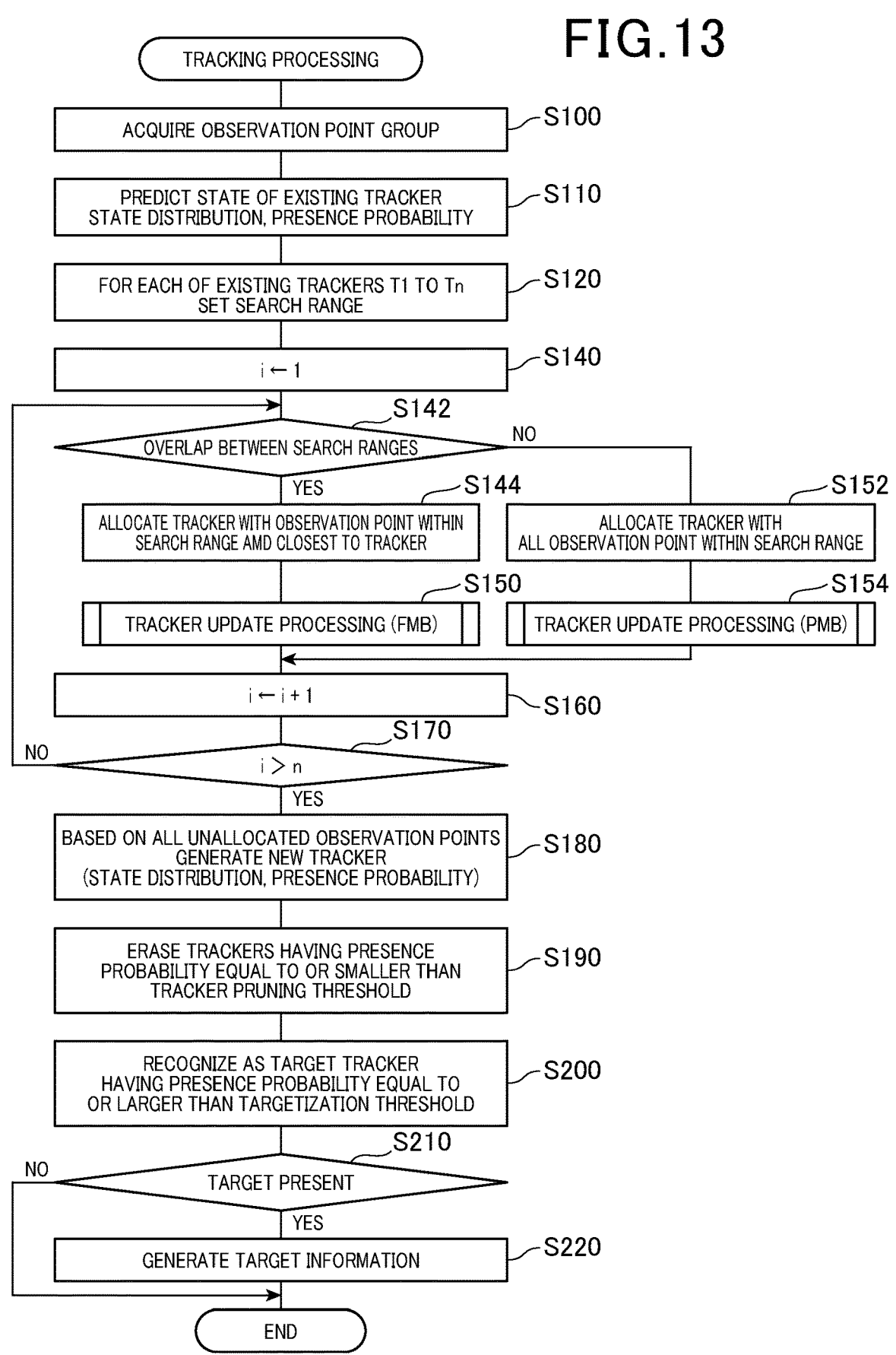
FIG. 13 is a flowchart illustrating tracking processing in a second embodiment.

Now, a flowchart in FIG. 13 is used to describe tracking processing executed by the tracking apparatus 20 in the second embodiment instead of the tracking processing in the first embodiment illustrated in FIG. 6.

In S100 to S120, the tracking apparatus 20 executes a process similar to that in the first embodiment.

In the subsequent S140, the tracking apparatus 20 initializes the identifier i to 1, the identifier i being used to identify the existing trackers T1 to Tn.

Figure 14:
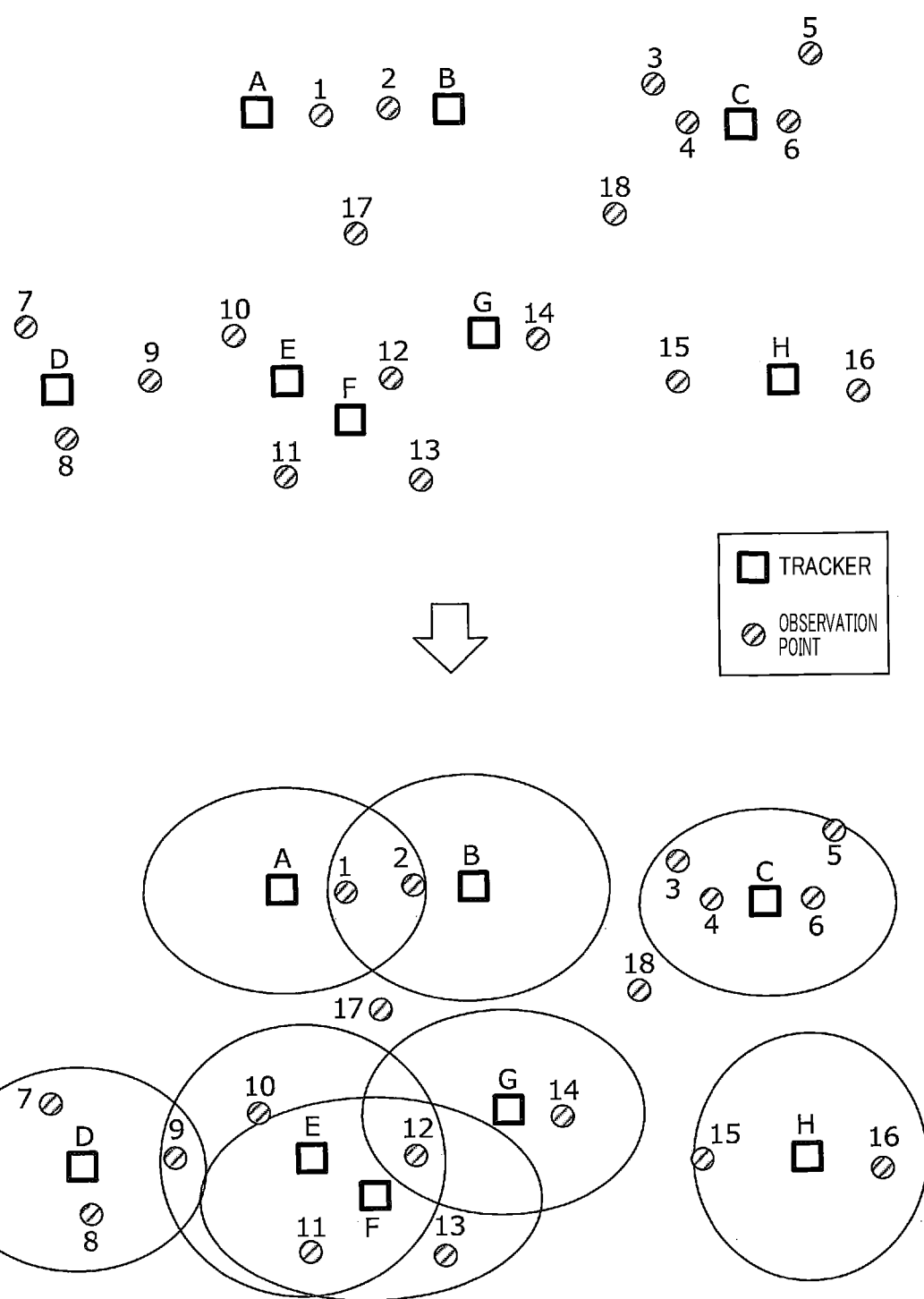
FIG. 14 is an explanatory diagram illustrating grouping of trackers utilizing search ranges.

In the subsequent S142, the tracking apparatus 20 determines whether the search range for the existing tracker Ti overlaps a search range for another tracker, and in a case where the search range for the existing tracker Ti overlaps the search range for another tracker, the process proceeds to S144, and if there is no overlap, the process proceeds to S152. For example, trackers A to H and observation points 1 to 18 are positioned as illustrated in FIG. 14, the trackers A, B, and D to G are determined to include overlapping search ranges, and the trackers C and H are determined to include no overlapping search range.

In S144, the tracking apparatus 20 allocates the existing tracker Ti with an observation point present within the search range and closest to the existing tracker Ti. For example, in FIG. 14, "observation 1" is allocated to the tracker A, "observation 2" is allocated to the tracker B, "observation 8" is allocated to the tracker D, "observation 10" is allocated to the tracker E, "observation 12" is allocated to the tracker F, and "observation 14" is allocated to the tracker G.

In the subsequent S150, the tracking apparatus 20 executes the tracker update processing as is the case with the first embodiment, and advances the processing to S160.

In S152, the tracking apparatus 20 allocates the existing tracker Ti with all the observation points present within the search range set for the existing tracker Ti. For example, in FIG. 14, "observation 3", "observation 4", "observation 5", and "observation 6" are allocated to the tracker C, and "observation 15" and "observation 16" are allocated to the tracker H.

In the subsequent S154, the tracking apparatus 20 executes the tracker update processing using the PMB, and advances the processing to S160.

Figure 15:
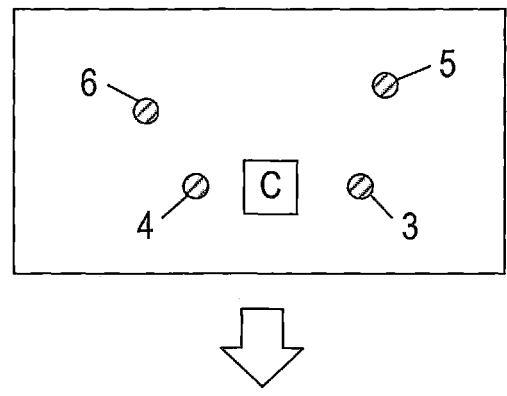
FIG. 15 is an explanatory diagram illustrating hypotheses taken into account for trackers with no overlap between search ranges.

For a tracker with a search range that overlaps no search range of another tracker, as illustrated in FIG. 15, when the number of observation points allocated is m, the number of hypotheses generated is m+1. In other words, no combinatorial explosion occurs, and the approach of the PMB, which takes all hypotheses into account, can be used for calculation.

The process in S160 to S220 is similar to that in the first embodiment.

2-3. Correspondence Between Terms

In the present embodiment, S142 corresponds to a sorting section in the present disclosure, S144 corresponds to an observation allocating section in the present disclosure, and S152 to S154 correspond to a precision updating section in the present disclosure.

2-4. Effects

The second embodiment described above in detail produces the effects (1a) to (1d) of the first embodiment described above, and further exerts the following effects.

(2a) In the present embodiment, the PMB is partially applied under the condition that the search range overlaps no other search range. This enables improvement of accuracy of the tracking processing for the trackers to which the PMB is applied, without a substantial increase in processing load.

3. Third Embodiment

3-1. Differences from First Embodiment

A second embodiment is similar to the first embodiment in the basic configuration, and thus differences between the embodiments will be described below. Note that the same reference numerals as those in the first embodiment denote identical configurations and that for these configurations, preceding descriptions are referenced.

The first embodiment described above uses the Gaussian distribution as the state distribution of the tracker. The third embodiment differs from the first embodiment in that the third embodiment uses a mixture Gaussian distribution.

3-2. Processing

Now, a flowchart in FIG. 16 is used to describe tracking processing executed by the tracking apparatus 20 in the third embodiment instead of the tracking processing in the first embodiment illustrated in FIG. 6.

In S100, the tracking apparatus 20 executes the process similar to that in the first embodiment.

In the subsequent S115, instead of executing the processing in S110 of the first embodiment, the tracking apparatus 20 uses Equation (13) to update the likelihood of each local maximum value included in the state distribution (hereinafter referred to as the mixture likelihood).

[Math. 9]

$$w_{j,k|k-1}=w_{j,k-1|k-1} \tag{13}$$

In other words, the mixture likelihood calculated in the above-described processing cycle, that is, the mixture likelihood before prediction, is directly used as the mixture likelihood in the predictive distribution. Note that j in Equation (13) is an identifier for identifying the local maximum value present in the state distribution (that is, the peaks of the individual Gaussian distributions forming the mixture Gaussian distribution). Here, the number of local maximum values present in the state distribution is assumed to be m.

In the subsequent S120 to S140, the tracking apparatus 20 executes the process similar to that in the first embodiment.

In the subsequent S155, the tracking apparatus 20 executes the tracker update processing using the mixture Gaussian distribution as the state distribution.

Figure 17:
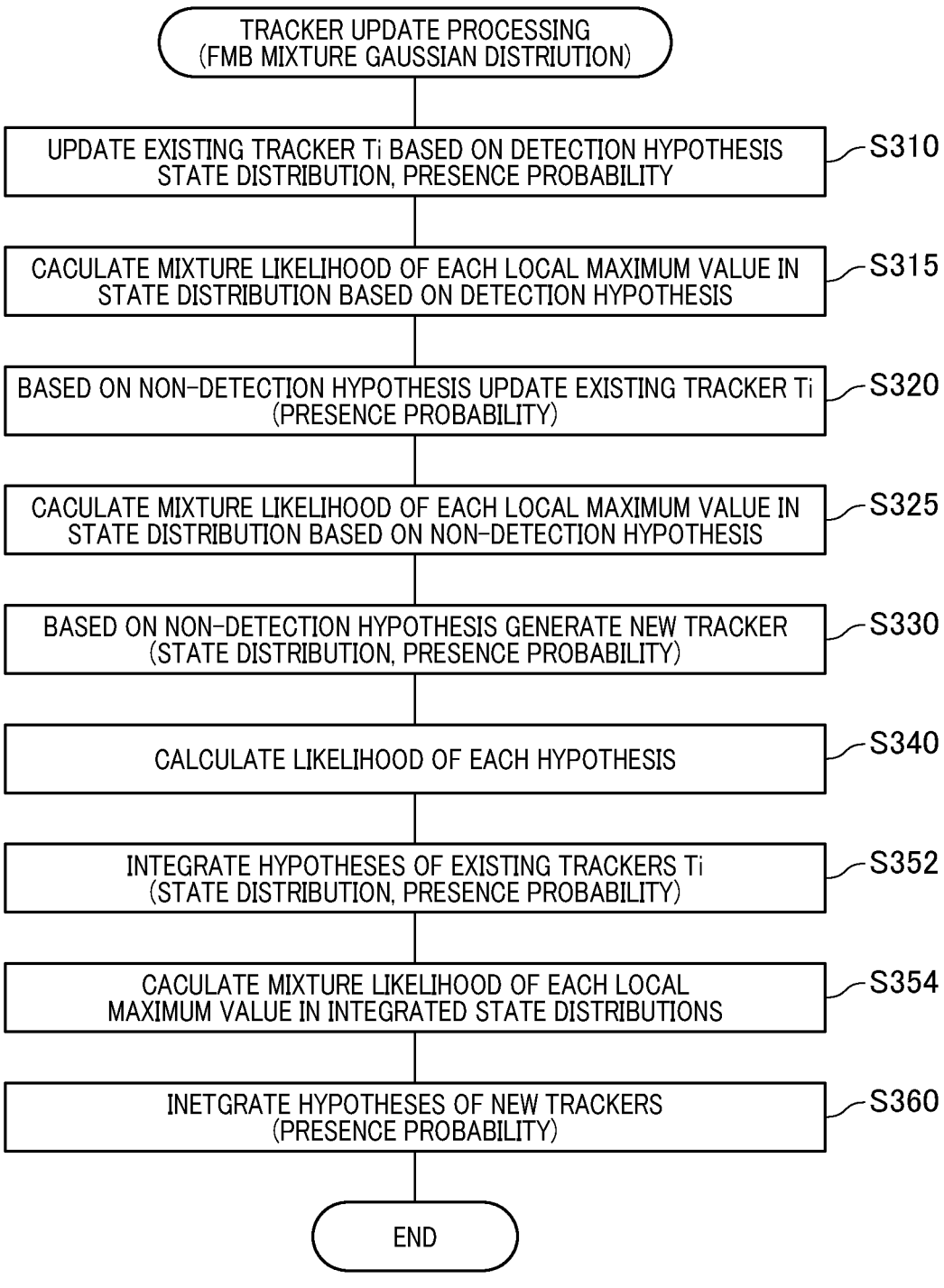
FIG. 17 is a flowchart illustrating tracker updating processing in the third embodiment.

Here, the details of the tracker update processing will be described with reference to a flowchart in FIG. 17. For the tracker update processing, differences from the tracker update processing in the first embodiment illustrated in FIG. 8 will be described.

In S310, the tracking apparatus 20 executes a process similar to that in the first embodiment.

In the subsequent S315, the tracking apparatus 20 uses Equations (14) and (15) to calculate the likelihood of each of the local maximum values in the state distribution (that is, hypothesis distribution) updated by the detected hypothesis.

[Math. 10]

$$ww_{j\_det,k|k} = w_{j,k|k-1} \times qz_j \tag{14}$$

$$w_{j\_det,k|k} = \frac{ww_{j\_det,k|k}}{\sum_{j=1}^{m} ww_{j\_det,k|k}} \tag{15}$$

Equation (14) means that the mixture likelihood of each local maximum value is updated according to the observation point allocated to the existing tracker Ti and the distance indicated by the local maximum value of interest in the predictive distribution of the existing tracker Ti. Equation (15) means that each mixture likelihood is normalized in such a manner that the mixture likelihoods of a plurality of local maximum values belonging to the same predictive distribution are summed to 1.

In the subsequent S320, the tracking apparatus 20 executes a process similar to that in the first embodiment.

In the subsequent S325, in a case of employing the non-detection hypothesis, the tracking apparatus 20 directly uses the predictive distribution as the state distribution after updating (that is, hypothesis distribution) to calculate the mixture likelihood of each local maximum value in the hypothesis distribution using Equation (16).

[Math. 11]

$$w_{j\_mis,k|k} = w_{j,k|k-1} \qquad (16)$$

In other words, as the mixture likelihood of the hypothesis distribution based on the non-detection hypothesis, the mixture likelihood of the predictive distribution calculated in S115 is directly used.

In the subsequent 330 and S340, the tracking apparatus 20 executes a process similar to that in the first embodiment.

In the subsequent S352, the tracking apparatus 20 integrates the hypotheses generated for the existing tracker Ti. Specifically, the tracking apparatus 20 generates, in accordance with Equation (17), the state distribution p(i) of the existing tracker Ti after updating, and calculates the presence probability r of the target associated with the existing tracker Ti in accordance with Equation (18).

[Math. 12]

$$p(i)_{k|k} = \sum_{j=1}^{2m} N(i; W_j \cdot \mu_j, W_j \cdot P_j) \qquad (17)$$

$$r_{k|k} = W_1 \cdot rr_{det_{k|k}} + W_2 \cdot rr_{mis_{k|k}} \qquad (18)$$

Figure 18:
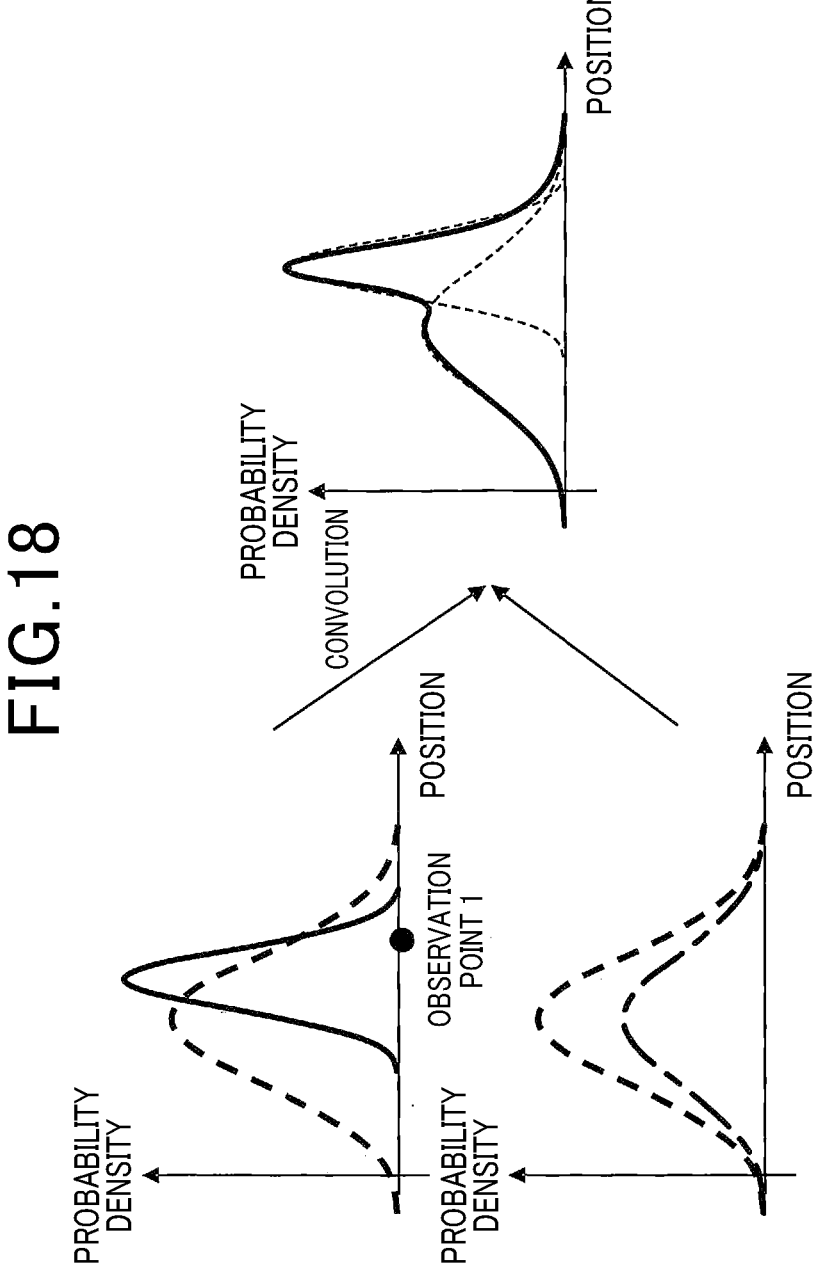
FIG. 18 is an explanatory diagram illustrating a manner in which the tracker update processing varies a state distribution in a case where the state distribution used is a mixture Gaussian distribution.

Equation (17) means that, as illustrated in FIG. 18, the state distribution after updating corresponds to simple addition of m Gaussian distributions individually representing the respective local maximum values in the hypothesis distribution of the detection hypothesis and m Gaussian distributions individually representing the respective local maximum values in the hypothesis distribution of the non-detection hypothesis. Equation (18) is the same as Equation (11).

In the subsequent S354, the tracking apparatus 20 uses Equations (19) and (20) to calculate the mixture likelihood of each of the local maximum values in the state distribution updated at S350.

[Math. 13]

$$w_{2i,k|k} = W_1 \cdot w_{i\_det,k|k} \qquad (19)$$

$$w_{2i,k|k} = W_2 \cdot w_{i\_mis,k|k} \qquad (20)$$

Equation (19) is the mixture likelihood of the local maximum value based on the hypothesis distribution of the detection hypothesis, and Equation (20) is the mixture likelihood of each local maximum value based on the hypothesis distribution of the non-detection hypothesis. In other words, in the present embodiment, each time the tracking update processing is executed, the number of local maximum values included in the state distribution after updating is twice the number of local maximum values included in the state distribution before updating.

In the subsequent S360, the tracking apparatus 20 executes a process similar to that in the first embodiment to end the tracker update processing.

Referring to FIG. 16, once the tracker update processing ends, in the subsequent S160 to S190, the tracking apparatus 20 executes a process similar to that in the first embodiment.

In the subsequent S195, the tracking apparatus 20 erases the local maximum values in the state distribution updated in S155 each of which has a mixture likelihood equal to or smaller than a local maximum value pruning threshold. Furthermore, for a state distribution from which at least one local maximum value has been erased, the tracking apparatus 20 recalculates the mixture likelihoods of the local maximum values in the state distribution in such a manner that the mixture likelihoods are summed to 1 (that is, normalized).

In the subsequent S200 to S220, the tracking apparatus 20 executes a process similar to that in the first embodiment to end the tracker update processing.

3-3. Correspondence Between Terms

In the present embodiment, S354 corresponds to a mixture likelihood calculating section in the present disclosure, and S195 corresponds to a local maximum value pruning section in the present disclosure.

3-4. Effects

The third embodiment described above in detail produces the effects (1a) to (1d) of the first embodiment described above, and further exerts the following effects.

(3a) The present embodiment uses, as the state distribution, the mixture Gaussian distribution instead of the simple Gaussian distribution. This enables suppression of loss of information due to integration of hypotheses, allowing robustness to be improved.

(3b) The present embodiment calculates the mixture likelihood for each of the local maximum values included in the state distribution, and erases the local maximum value having a mixture likelihood equal to or smaller than the local maximum value pruning threshold. This enables the state distribution to be restrained from being more complicated than required and thus allows suppression of an increase in computational load due to an increase in the number of local maximum values.

4. Other Embodiments

The embodiments of the present disclosure have been described above. However, the present disclosure is not limited to the above-described embodiments, and may be varied for implementation.

(3a) The above-described embodiments use the position of the observation point as the state to be updated by the tracking processing. However, the present disclosure is not limited to the position of the observation point, and may use information obtained from the target, such as the speed or acceleration of the observation point.

(3b) The above-described embodiments use the PMB filter to update the state of the tracker. However, the state of the tracker may be updated using a filter other than the PMB filter used in the theory of RFS, for example, the PHD filter, an LMB filter, a PMBM filter, or the like. LMB stands for Labeled Multi-Bernoulli, and PMBM stands for Poisson Multi-Bernoulli Mixture.

(3c) The above-described embodiments use the presence probability represented by a value of from 0 to 1 as an presence determination value used to determine whether any target is associated with the tracker. However, the present disclosure is not limited to the presence probability. For example, the presence determination value used may be radix information in which a value of 1 or more is allowable.

(3d) The tracking apparatus 20 and approach described in the present disclosure may be implemented by a dedicated computer provided by configuring a processor and a memory, the processor being programmed to execute one or a plurality of functions embodied by a computer program and a memory. Alternatively, the tracking apparatus 20 and approach described in the present disclosure may be implemented by a dedicated computer provided by configuring a processor with one or more dedicated hardware logical circuits. Alternatively, the tracking apparatus 20 and approach described in the present disclosure may be implemented by one or more dedicated computers including a combination of a processor programmed to execute one or a plurality of functions and a memory with a processor including one or more hardware logic circuits. The computer program may be stored in a computer-readable non-transitory tangible recording medium as instructions executed by a computer. The approach for implementing the functions of the sections included in the tracking apparatus 20 need not necessarily include software, and all of the functions may be implemented using one or a plurality of pieces of hardware.

(3e) In the above-described embodiments, a plurality of functions of one component may be implemented by a plurality of components, or one function of one component may be implemented by a plurality of components. A plurality of functions of a plurality of components may be implemented by one component, or one function implemented by a plurality of components may be implemented by one component. A part of configuration of each of the above-described embodiments may be omitted. At least a part of configuration of each of the above-described embodiments may be added to or may replace the configuration of another embodiment.

(3f) In addition to the tracking apparatus 20 described above, the present disclosure can be implemented in various forms such as a system including the tracking apparatus 20 as a component, a program causing a computer to function as the tracking apparatus 20, a non-transitory tangible recording medium such as a semiconductor memory which includes the program recorded therein, and a target tracking method.

What is claimed is:

1. A tracking apparatus comprising a central processing unit (CPU) and a memory storing a program, wherein the CPU is configured to execute the program to perform:

acquiring, for each processing cycle, observation information corresponding to each of a plurality of observation points from a sensor observing a state of a target present around a vehicle;

selecting observation points satisfying a preset generation condition from an observation point group including the plurality of observation points for which the observation information is acquired;

generating a tracking information comprising a state distribution probabilistically indicating a state of observation information for each of the selected observation points;

generating a predictive distribution for each of existing tracking information that are tracking information generated up to a last processing cycle, the predictive distribution being a state distribution in which the state of the observation information of the existing tracking information in a current processing cycle is predicted based on the state distribution included by the existing tracking information; and updating, for each of the existing tracking information, the state distribution included by the existing tracking information using the predictive distribution that is generated and the observation information obtained from the observation point group in the current processing cycle, wherein updating the state distribution includes:

exclusively allocating the observation point to each of the existing tracking information in accordance with a distance between the observation information that is acquired and the observation information indicated by the predictive distribution; and generating, for each combination of two of subject tracking information and two of the observation points among a combination group, the subject tracking information being a existing tracking information to which the observation point is allocated, a combination likelihood that is a likelihood of the combination and a combination distribution that is a state distribution updated on an assumption that the combination is correct, the subject target is a target associated with the subject tracking information.

2. The tracking apparatus according to claim 1, wherein the CPU is further configured to execute the program to perform:

generating the state distribution after updating by integrating, by convolution using the combination likelihood, the combination distributions each generated by the combination for a respective one of the combinations belonging to the combination group.

3. The tracking apparatus according to claim 1, wherein allocating the observation point to each of the existing tracking information comprises allocating up to one of the observation points to each of the existing tracking information.

4. The tracking apparatus according to claim 1, wherein the CPU is further configured to execute the program to perform:

generating a presence determination value used to determine, for each of the tracking information, whether any target is associated with the tracking information; and removing the tracking information for which the presence determination value is equal to or smaller than a pruning threshold.

5. The tracking apparatus according to claim 1, wherein the CPU is further configured to execute the program to perform:

a search range for each of the existing tracking information, wherein allocating the observation point to each of the existing tracking information comprises allocating the observation points present within the search range.

6. The tracking apparatus according to claim 5, wherein the CPU is further configured to execute the program to perform:

updating the state of the tracking information using all the observation points present within the search range; and sorting the tracking information in such a manner that the updating is applied to the tracking information including the search range overlapping another search range and that the updating is applied to the tracking information including the search range not overlapping another search range.

7. The tracking apparatus according to claim 1, wherein the state distribution is represented by a mixture Gaussian distribution.

8. The tracking apparatus according to claim 7, wherein the CPU is further configured to execute the program to perform:

calculating, for each of a plurality of Gaussian distributions used as components of the mixture Gaussian distribution representing the state distribution, a mixture likelihood that is a likelihood of the Gaussian distribution; and removing, from the state distribution, the Gaussian distribution for which the mixture likelihood is equal to or smaller than a local maximum value pruning threshold.

* * * * *